US008965450B2

(12) United States Patent
Hofmann et al.

(10) Patent No.: US 8,965,450 B2
(45) Date of Patent: Feb. 24, 2015

(54) USER TERMINAL HAVING FIRST AND SECOND RADIOS SWITCHABLY CONNECTABLE TO FIRST AND SECOND ANTENNAS FOR RADIO ACCESS NETWORKS TELECOMMUNICATION

(75) Inventors: Dirk Hofmann, Bietigheim-Bissingen (DE); Manfred Litzenburger, Bruchsal (DE)

(73) Assignee: Alcatel Lucent, Boulogne-Billancourt (FR)

( * ) Notice: Subject to any disclaimer, the term of this patent is extended or adjusted under 35 U.S.C. 154(b) by 503 days.

(21) Appl. No.: 12/274,894

(22) Filed: Nov. 20, 2008

(65) Prior Publication Data
US 2009/0137214 A1    May 28, 2009

(30) Foreign Application Priority Data
Nov. 23, 2007  (EP) .................................... 07291407

(51) Int. Cl.
*H04B 7/02*   (2006.01)
*H04B 1/44*   (2006.01)
*H04B 7/08*   (2006.01)

(52) U.S. Cl.
CPC .............. *H04B 7/0814* (2013.01); *H04B 7/022* (2013.01)
USPC ........................................ 455/553.1; 455/560

(58) Field of Classification Search
USPC .......................... 455/82, 88, 552.1, 553.1, 560
See application file for complete search history.

(56) References Cited

U.S. PATENT DOCUMENTS 6,898,441 B1 * 5/2005 Kogiantis et al. .......... 455/562.1
7,702,360 B2 * 4/2010 Chiu ........................... 455/552.1
2006/0116182 A1 * 6/2006 Bekritsky .................... 455/575.7

FOREIGN PATENT DOCUMENTS

| CN | 1697499 | 11/2005 |
| EP | 1596513 | 11/2005 |
| WO | WO 2006/114731 A1 | 11/2006 |
| WO | WO 2007/025309 A1 | 3/2007 |

OTHER PUBLICATIONS

European Search Report, issued May 6, 2008.

* cited by examiner

*Primary Examiner* — Benny Lee
(74) *Attorney, Agent, or Firm* — Fay Sharpe LLP

(57) ABSTRACT

A method is provided of operation of a user terminal in a network for radio communications comprising a first radio access network and a second radio access network. The user terminal comprising a first radio, a second radio, a first antenna and a second antenna. The first radio comprises two ports for connection to antennas. At least one of the two antennas is switchably connectable to each of the radios. The method comprising the following steps: connecting the two antennas to the first radio such that each port is connected to a respective antenna, and receiving data at the first radio passed via a radio communication connection from a first radio access network to the two antennas; switching the second antenna from connection to the first radio to connection to the second radio, receiving data at the first radio passed via a radio communication connection from the first radio access network to the first antenna, and receiving data at the second radio passed via a radio communication connection from a second radio access network to the second antenna.

25 Claims, 6 Drawing Sheets

(A)

(B)

(C)

USER TERMINAL HAVING FIRST AND SECOND RADIOS SWITCHABLY CONNECTABLE TO FIRST AND SECOND ANTENNAS FOR RADIO ACCESS NETWORKS TELECOMMUNICATION

FIELD OF THE INVENTION

The present invention relates to telecommunications, in particular to radio communications.

DESCRIPTION OF THE RELATED ART

Networks for radio telecommunications, such as of 3GPP System Architecture Evolution type, are known that are heterogeneous in that they include various types of radio access technologies, RATs, such as from among Global System for Mobile communication (GSM), Universal Mobile Telecommunications System (UMTS), Wireless Local Area Network (WLAN), Worldwide Interoperability for Wireless Access (WiMAX), and Long Term Evolution (LTE) types. Such heterogeneous networks have benefits both for the network users and the network operator. The user terminal can switch to the RAT that is most suitable at the relevant time. The operator can do load-sharing between RATs so as to improve network usage and performance.

A problem with such known heterogeneous networks is that, in use, for user terminals to be able to connect with more than one type of RAT, the user terminals require additional hardware components. This can lead to problems in meeting stringent internal space requirements of user terminals. For example, so-called "dual mode" user terminals, that can connect selectably to two different types of networks in line with Third Generation Partnership Project, 3GPP, System Architecture Evolution (SAE) have two separate radios, for example, one for GSM and one for UMTS, one for UMTS and one for LTE, or one for 3GPP radio proper (e.g. GSM, UMTS, or LTE) and one for non-3GPP radio (e.g. WLAN, WiMAX, 3GPP2). Both radios have to be operated in parallel during signal quality measurements to multiple RATs, for example as part of a procedure of handover of a call connection with the user terminal between RATs. Accordingly, the radios have separate antennas.

Some radios that are software-defined are capable of connecting with more than one type of RAT, for example such interfaces may have sufficient spectral range to connect selectably with both GSM and UMTS RATs. However all relevant frequency ranges (e.g. from 900 MHz for GSM to 5 GHz for IEEE 801.11a) are not handled by a single interface so as a practical matter, a user terminal that is multi-RAT-connectable will almost always include multiple radios.

As further background, Multiple-Input Multiple-Output (MIMO) systems are known. MIMO is basically the use of multiple antennas both at the transmitter and corresponding receiver with the aim of improving performance of radio communication systems. MIMO can include one or more of preceding, spatial multiplexing and diversity coding.

In contrast, Single-Input Single-Output (SISO) functionality is where neither the transmitter nor the receiver operates with multiple antennas, but rather there is a single antenna at each end.

Another type of system is Multiple-Input Single-Output (MISO) system. This is where a receiver having a single receive antenna receives signals sent from a transmitter having multiple antennas. An example is a base station with multiple antennas transmitting downlink to a user terminal having a single antenna.

A further type of system is a Single-Input Multiple-Output (SIMO) system. Here a receiver having multiple antennas receives a signal from a transmitter having a single antenna. An example is reception of signals sent uplink from a user terminal having a single antenna to a base station having multiple antennas.

SUMMARY OF THE INVENTION

The reader is referred to the appended independent claims. Some preferred features are laid out in the dependent claims.

An example of the present invention is a method of operation of a user terminal in a network for radio communications comprising a first radio access network and a second radio access network. The user terminal comprising a first radio, a second radio, a first antenna and a second antenna. The first radio comprises two ports for connection to antennas. At least one of the two antennas is switchably connectable to each of the radios. The method comprising the following steps: connecting the two antenna to the first radio such that each pot is connected to a respective antenna, and receiving data at the first radio passed via a radio communication connection from a first radio access network to the two antennas; switching the second antenna from connection to the first radio to connection to the second radio, receiving data at the first radio passed via a radio communication connection from the first radio access network to the first antenna, and receiving data at the second radio passed via a radio communication connection from a second radio access network to the second antenna.

The radio communication connection from the first access network to the two antennas may comprise a multiple-antenna reception connection such as a Multiple-Input Multiple-Output (MIMO) connection or downlink Single-Input Multiple-Output (SIMO) connection. The radio communication connections from the first radio access network to the first antenna and from the second access network to the second antenna may comprise single-antenna radio reception connections such as Single-Input Single-Output (SISO) connections or downlink Multiple-Input Single-Output (MISO) connections.

Data reception at the user terminal may continue by operation of the first radio, which may be multiple-antenna radio communication-capable radio, via one antenna, whilst at the same time, link quality measurement using the other antenna is possible, for example in respect of link quality to a handover-candidate radio access network.

Preferably, the first radio is Multiple-Input Multiple-Output (MIMO) capable and said radio communication connection to the two antennas is a MIMO connection. Preferably one or each of the radio communication connections to a respective one of the antennas is a Single-Input Single-Output (SISO) connection or downlink Multiple-Input Single-Output (MISO) connection.

Partial or complete switching from one radio to the other is possible. Another possibility is that a complete switch of a service session to the second radio occurs, in what is known as a handover. In a handover, a radio communication link to the first radio via one of the antennas is maintained at least until a radio communication link to the second radio via another of the antennas is established after which the link to the first radio is released. Accordingly, the call session may be handed over in an apparently seamless fashion, without loss of data, Accordingly, the call session may be handed over in an apparently seamless fashion, without loss of data.

BRIEF DESCRIPTION OF THE DRAWINGS

Embodiments of the present invention will now be described by way of example and with reference to the drawings, in which.

DETAILED DESCRIPTION OF THE INVENTION

Figure 1:
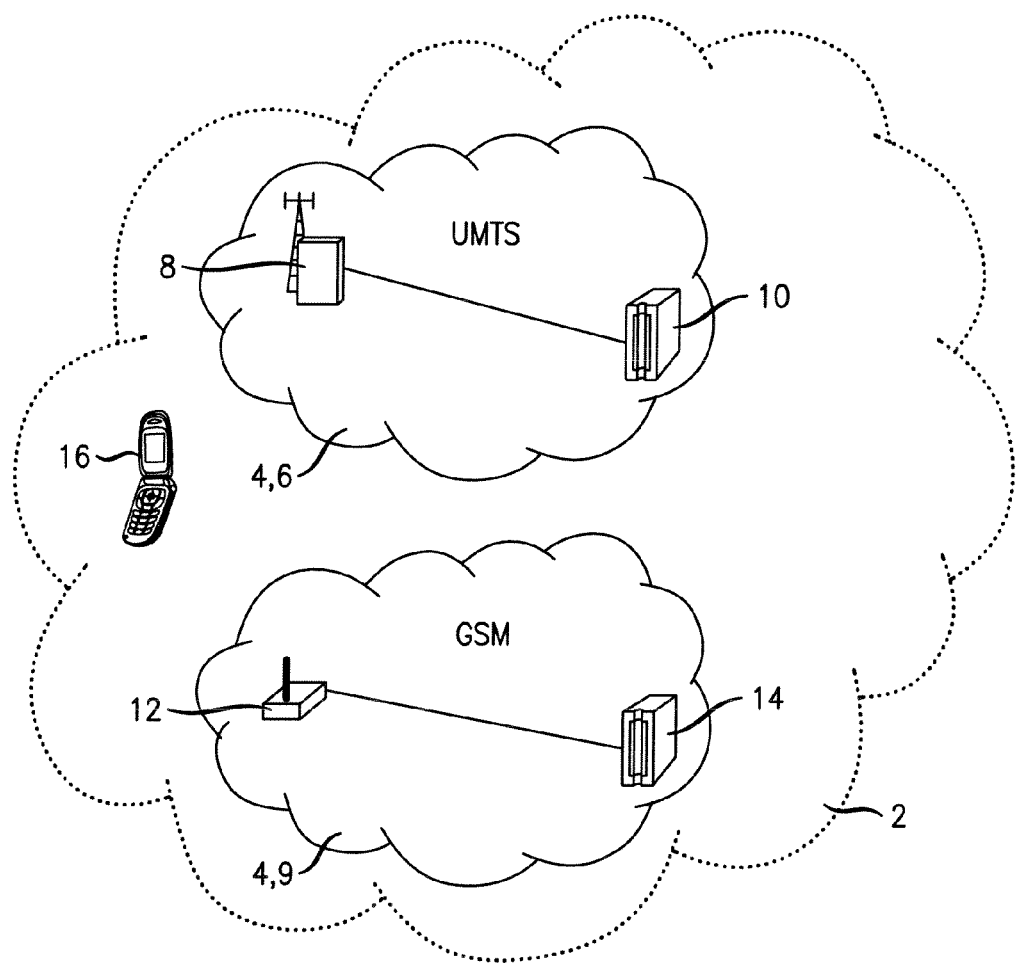
FIG. 1 is a diagram illustrating a heterogeneous network according to a first embodiment of the present invention.

One or more embodiments or implementations are hereinafter described in conjunction with the drawings, where like reference numerals are used to refer to like elements throughout, and where the various features are not necessarily drawn to scale.

A first example is now described in terms of a network, a user terminal used in the network and method of intersystem measurement.

The Network

As shown in FIG. 1, a heterogeneous network 2 for wireless telecommunications includes multiple radio access networks 4, known as radio access technologies, RATs, of at least two different types. In FIG. 1, two radio access networks are shown for simplicity. One of the radio access networks 4 is a RAT 6 of Universal Mobile Telecommunications System (UMTS) type, and includes a UMTS base station 8 connected to a base station controller 10 of UMTS type. The other access network 4 is a RAT 9 of Global System for Mobile communication (GSM) type and includes a GSM base station 12 connected to a base station controller 14 of GSM type. Radio access networks include further base stations (not shown). A user terminal 16 is shown, by way of example, within the coverage of the network 2.

The User Terminal

Figure 2:
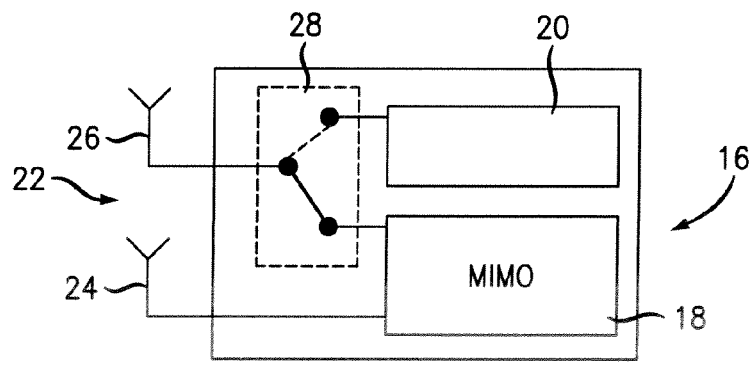
FIG. 2 is a diagram illustrating a user terminal for use in the network shown in FIG. 1, and FIGS. 3(A), 3(B) and 3(C) are diagrams illustrating procedures in the user terminal shown in FIG. 2 for signal quality measurement to another radio access technology (RAT) of the heterogeneous network than the RAT that the mobile is call-connected to, FIG. 4 is a message sequence diagram for the signal quality measurement procedure.

The user terminal 16 is shown in more detail in FIG. 2. The user terminal includes a Multiple-Input Multiple-Output (MIMO) radio 18, a non MIMO-capable radio 20, and an antenna system 22 consisting of two antennas 24, 26. The MIMO radio 18 has two signal input/output ports, each for connection to a respective antenna so as to receive multiple-input signals, for example at somewhat overlapping times, for example simultaneously. This is multiple-input reception. The non-MIMO radio 20 has one signal input/output port. The radios 18, 20, are radios including radio signal generators and decoders, in other words radio transmitter-receivers ("transceivers"). One antenna 24 is connected to the MIMO radio 18. The other antenna 26 is connected to a switch 28 via which that antenna 26 is selectably connected to either the MIMO radio 18 or the non-MIMO radio 20.

Intersystem Measurement Operation

Measurements of the quality of radio communication from the mobile terminal to various base stations around the mobile terminal are made periodically. This is so as to determine whether a handover to a second base station would be appropriate of a radio connection with a first base station. Such measurements are known as intersystem measurements, the first base station and the second base station being of different radio access technology (RAT) type.

Figure 3:
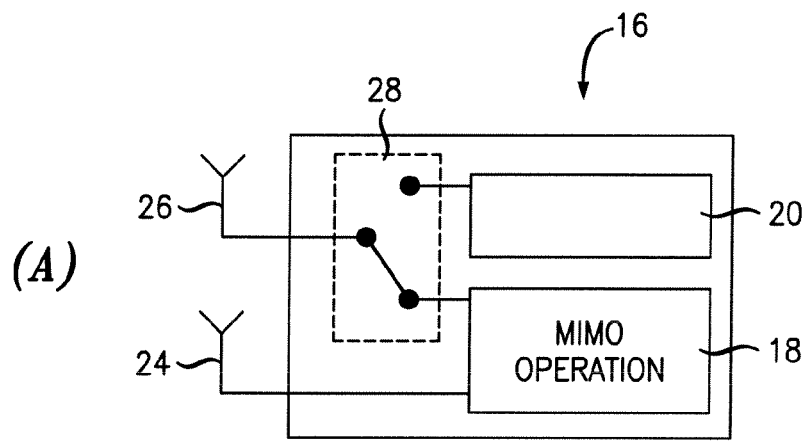
Figure 3:
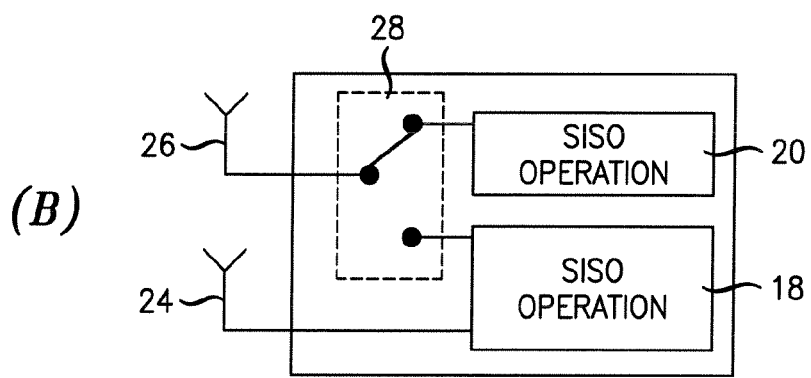
Figure 3:
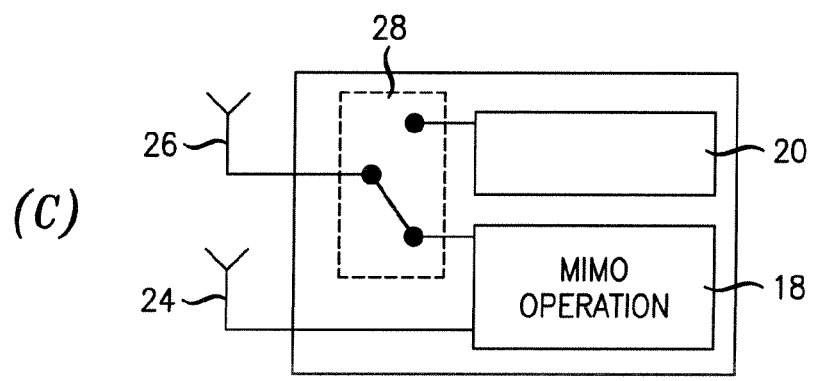

We now refer to FIG. 3, in which the user terminal is shown at three times, namely (A) before, (B) during, and (C) after, intersystem measurement.

As shown in FIG. 3(A), initially both antennas 24, 26 of the user terminal are connected via the switch 28 to the MIMO radio 18 for MIMO radio communications with one of the base stations and the non-MIMO radio 20 is not connected. Data is received by the user terminal as part of a service session, such as a voice call connection.

As shown in FIG. 3(B), the second antenna 26 is switched to being connected to the non-MIMO interface 20. Accordingly, the current radio connection of the user terminal to the first base station is maintained via just the first antenna 24 of the two antennas 24, 26, in consequence, the radio 18 is in a SISO mode of operation, so having a lower data rate than when in MIMO operation. Test signals used for measurement of radio link quality are received from a target base station via the second antenna 26 and passed to the non-MIMO radio 20.

Once this link quality measurement phase is complete, as shown in FIG. 3(C), both antennas 24, 26 of the user terminal are reconnected via the switch 28 to the MIMO radio 18 for MIMO radio communications with one of the base stations.

Figure 4:
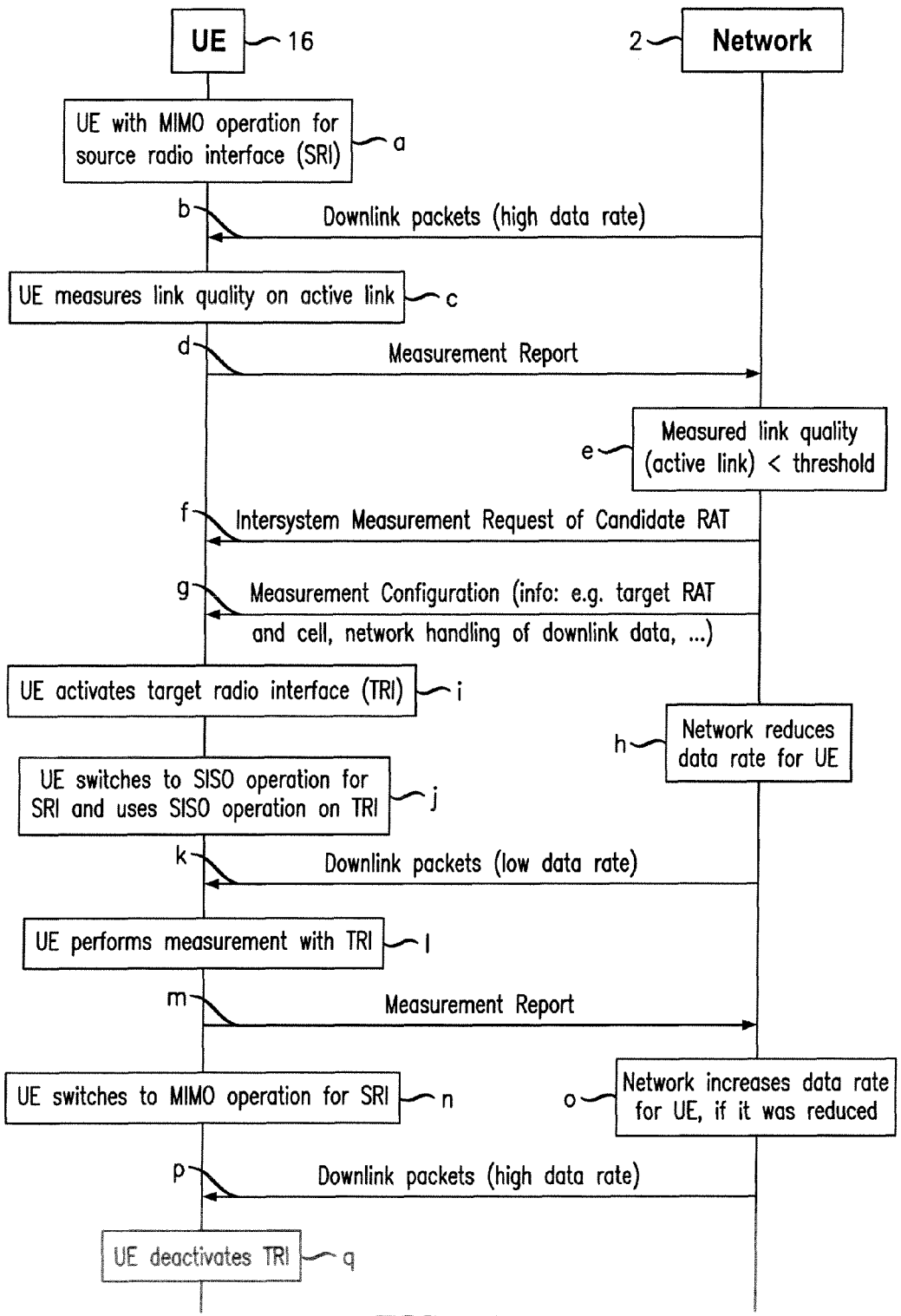

An example sequence of process steps and messaging between the user terminal and network in the operation shown in FIG. 3, is shown in more detail in FIG. 4.

As shown in FIG. 4, the user terminal (UE) 16 is in MIMO operation (step a). (The MIMO radio 18 is referred to in FIG. 4 as the source radio interface, SRI). Using this MIMO connection from a base station (not shown) of a first radio access network 2, packets are sent downlink to the user terminal 16 at a fast data rate (step b). Periodically, the user terminal 16 measures (step c) link quality across this radio link for example by detecting signal to noise ratio. A measurement report is then sent (step d) from the user terminal 16 to the base station.

In the base station, it is determined (step e) that the measured link quality has gone below a predetermined threshold. In this case a request is sent (step f) to the user terminal that it makes a measurement of link quality to a base station of another radio access technology, RAT. Accordingly, information is sent (step g) to the user terminal as to which RAT and cell within that RAT to measure the link quality of. The network 2 is aware that the measurement is requested and the expected time involved in executing the measurement and so reduces (step h) the rate at which data is to be sent to the user terminal.

As a next step, the user terminal activates the switch so as to make the connection (step i) between the non-MIMO interface 20 (which is the target interface for measurement, hence target radio interface, TRI, referred to in FIG. 4).

As a next step (step j) the switch 28 is switched so that source radio interface (SRI), namely MIMO interface 18, has Single-Input Single-Output operation, and the target radio interface, namely non-MIMO interface 20, operates also. As data packets continue (denoted k in FIG. 4) to be sent downlink to the user terminal at the reduced data rate to the MIMO interface 18, the user terminal performs (step l) measurement of link quality via non-MIMO interface 20.

The measurement is best done quickly so as to reduce the impact on overall data rate. This is because there is a reduction in data rate upon a SISO connection mode being used in place of a MIMO connection mode at interface 18. A known scheme of retransmission for accuracy, known as the Hybrid Automatic Retransmission reQuest (HARQ) scheme, is used on data connection, both downlink and uplink. Whilst the measurement is occurring, there is often an increase in the HARQ retransmission requests, which further reduces data rate.

In measurements of signal quality to a Radio Access Technology, RAT, for example in accordance with IEEE802.11, beacon or pilot signals are used. These signals have associated transmission periods, e.g. 100 ms. The time required for the measurement must be set to be long enough to allow for such transmission periods.

Once the measurement has been performed, a measurement report is sent (step m) from the user terminal 16 to the network 2. The user terminal then switches back (step n) to MIMO operation using the MIMO radio 18 that is referred to in FIG. 4 as the source radio interface, SRI. Using this MIMO connection from a base station of a first radio access network, the downlink data rate is increased (step o) so packets are sent downlink (step p) to the user terminal at the fast data rate. The second interface 20, (referred to in respect of FIG. 4 as target radio interface TRI) is then deactivated (step q).

In an alternative, otherwise similar, embodiment (not shown), the comparison of measured link quality to the threshold is made in the user terminal instead of in the base station of the network 2. If the threshold is exceeded, then a request for measurement configuration data is sent to the network 2, instead of the measurement request (step f in FIG. 4) being sent to the user terminal. Accordingly, in this embodiment, it is the user terminal that generates the trigger for intersystem measurement.

In this embodiment, a Hybrid Automatic Repeat reQuest (HARQ) mechanism is used to improve overall transmission accuracy by seeking to correct for errors in received signals including those arising in consequence of temporarily using SISO operation mode rather than MIMO operation mode at the MIMO-capable radio 18. To keep overall data rate high, the duration of SISO operation is kept short; in other words, switching from MIMO to SISO then back to MIMO is done fast. In particular, by doing this sufficiently fast, namely within a few milliseconds, the level of errors introduced (and hence corrected for using the HARQ retransmission scheme), is relatively small. This is a similar level of errors to that caused by fast fading of radio signals. Accordingly, the measurement is started as soon as the target radio interface, namely the non-MIMO radio, is connected via the switch to the antenna.

Another Example

Another example is now described, namely a network, a user terminal used in the network and a method of handover.

The Network

Figure 5:
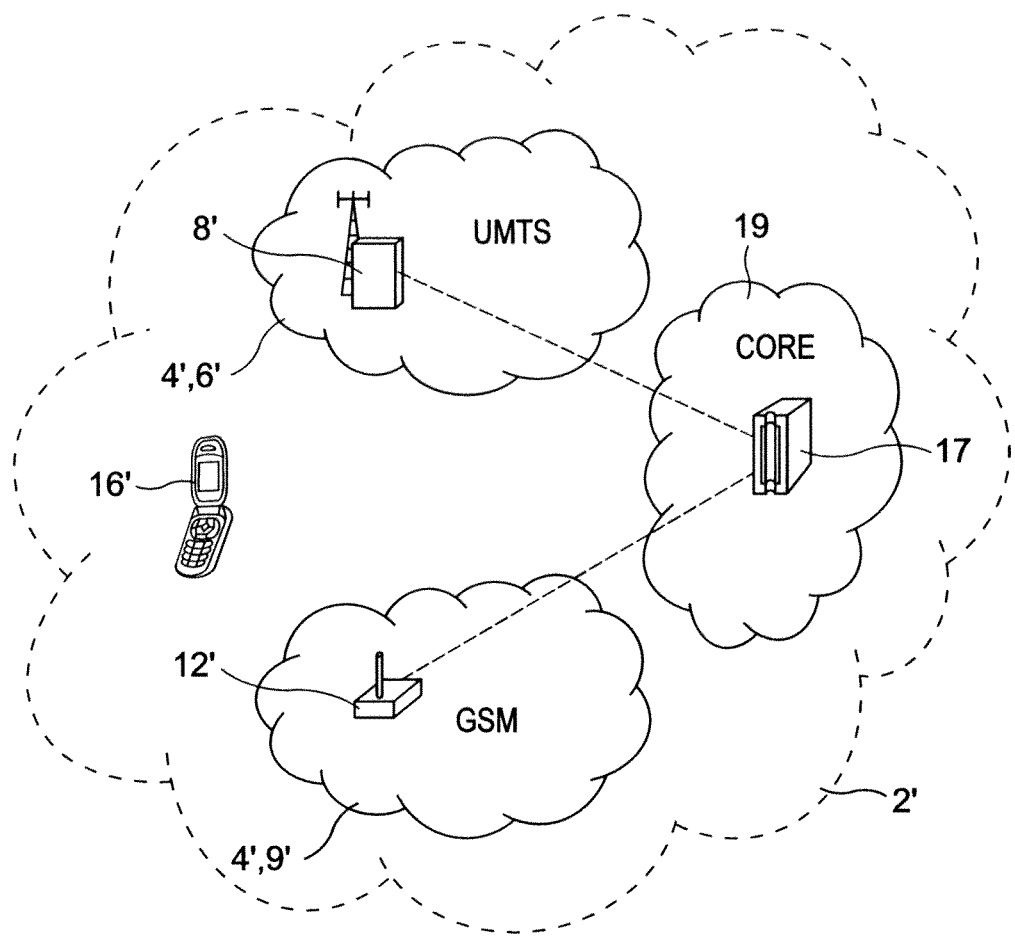
FIG. 5 is a diagram illustrating a heterogeneous network according to a second embodiment of the present invention.

As shown in FIG. 5, an alternative heterogeneous network 2' for wireless telecommunications includes multiple access radio access networks 4', known as radio access technologies, RATs, of at least two different types. In FIG. 5, two radio access networks are shown for simplicity. One of the radio access networks 4' is a RAT 6' of Universal Mobile Telecommunication System (UMTS) type, and includes a UMTS base station 8'. The other radio access network 4' is a RAT 9' of Global System for Mobile communication (GSM) type and includes a GSM base station 12'. Subnetworks include further base stations (not shown). A user terminal 16' is shown, by way of example, within the coverage of the network 2'.

The network 2' includes the UMTS base station 8', the GSM base station 12', and a central base station controller 17 having multi-RAT functionality, namely both UMTS and GSM functionality. This central controller 17, which is part of a core network 19, is connected to both the UMTS base station 8' and the GSM base station 12'.

The User Terminal

Figure 6:
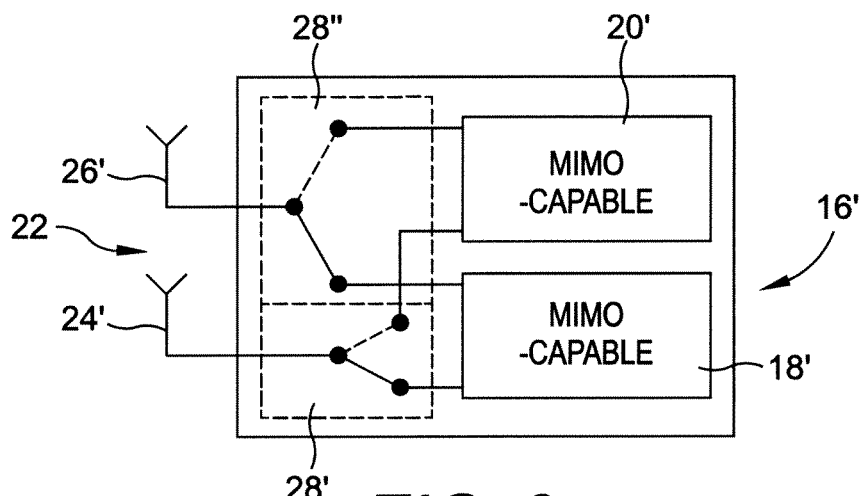
FIG. 6 is a user terminal for use in a network according to the second embodiment of the present invention.

The user terminal 16' is shown in more detail in FIG. 6. The user terminal includes a first Multiple Input Multiple Output (MIMO) radio 18', a second MIMO radio 20', an antenna system 22' consisting of two antennas 24', 26'. Each of the MIMO radios 18', 20' has two signal input/output ports, each for connection to a respective antenna. One antenna 24' is connected to a first switch 28' via which that antenna 24' is selectably connected to either the first MIMO radio 18' or the second MIMO radio 20'. The other antenna 26' is connected to a second switch 28" via which that antenna 26' is selectably connected to either the first MIMO radio 18' or the second MIMO radio 20'.

Handover Operation

We now refer to FIGS. 7(A) to 7(C), in which the user terminal is shown at three times, namely (A) before, (B) during, and (C) after a make before break, MBB, handover.

As shown in FIG. 7(A), initially both antennas 24', 26' of the user terminal are connected via the switches 28', 28" to the first MIMO-capable radio 18' (e.g., MIMO OPERATION: SOURCE RADIO INTERFERENCE) for MIMO radio communications with one of the base stations.

As shown in FIG. 7(B), in a first stage of handover, the second antenna 26' is switched by the second switch 28" to being connected to the second MIMO-capable interface 20'. Accordingly, the radio connection of the user terminal to the first base station is maintained via the first antenna 24' connected to the first MIMO-capable interface 18' (e.g., SISO OPERATION: SOURCE RADIO INTERFERENCE) operating in a SISO mode of operation, and also via the second antenna 26' connected to the second MIMO-capable interface 20' (e.g., SISO OPERATION: TARGET RADIO INTERFERENCE) operating in a SISO mode of operation.

In a second stage of handover, as shown in FIG. 7(C), the first antenna 24' is switched by the first switch 28' to being connected to the second MIMO-capable radio 20' (e.g., MIMO OPERATION: TARGET RADIO INTERFERENCE). Accordingly, both antennas 24', 26' of the user terminal are connected to the second MIMO-capable radio 20' operating in a MIMO mode of operation in connecting the user terminal to the second radio access network. Of course, the radio connection of the user terminal to the first radio access network (via the first radio 18') is thereby ceased.

Due to its two stage ("make-before-break") nature, the handover is apparently seamless, in other words not noticed from a user's perspective and with no significant loss of data due to the handover.

There is a radio access network ("source" RAN) of a first Radio Access Technology associated with the first MIMO-capable interface 18' and a radio access network ("target" RAN) of a second Radio Access Technology associated with the second MIMO-capable interface 20'. Accordingly, the first MIMO-capable radio 18' is denoted the source radio interface (SRI), and the second MIMO radio 20' is denoted the target radio interface (TRI).

Both the source RAN and target RAN are instructed to reduce downlink data traffic to the user terminal from a short time before until a short time after handover, because during handover SISO rather than MIMO operation mode is used at the MIMO-capable radios 18', 20'. A RAN is a radio access network, such as a base station connected to an associated base station controller.

Figure 8:
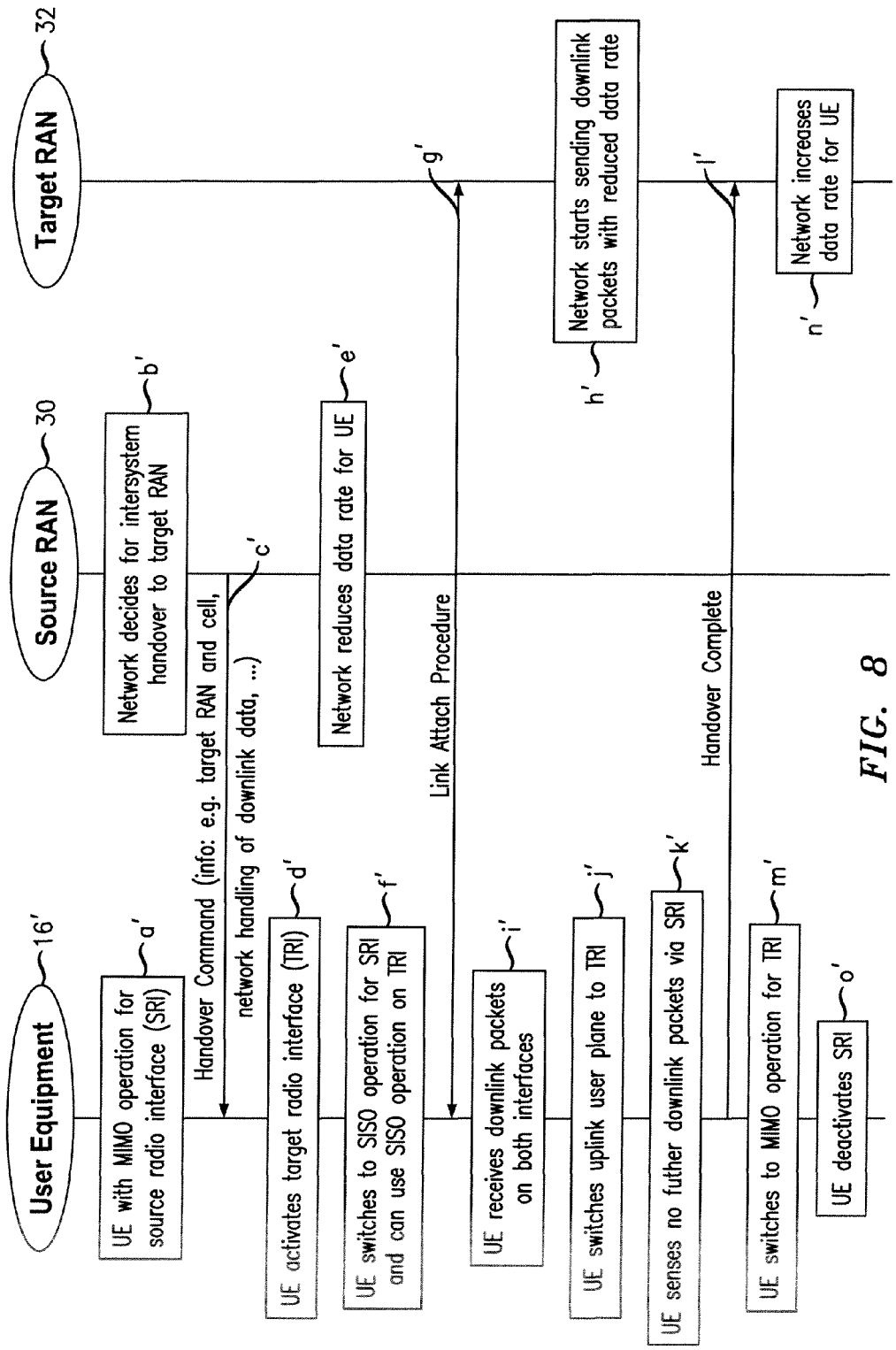
FIG. 8 is a message sequence diagram for the handover procedure.

As shown in FIG. 8, the handover process in more detail is as follows:

Initially, the user terminal 16' is in MIMO operation (step a') using SRI 18' in radio connection via antennas 24', 26' to a source RAN 30. Using this MIMO radio connection, data is sent between the source RAN 30 and the user terminal. At some point in time, for example because of a link quality measurement indicating a significant drop in link quality, a decision is made (step b') in the source RAN 30 of the network 2' to handover the radio connection with the source RAN to with another RAN, here denoted the target RAN. Accordingly the source RAN 30 sends a handover command to the user terminal (step c'), the command including identifiers of the target RAN 32 and which cell of the target RAN 32 to connect to. In response, the user terminal activates (step d') its target radio interface 20'. The source RAN 30 of the network 2' then reduces (step e') the data rate to the user terminal 16' from a high data rate to a lower one.

The user terminal is then switched (step f'') to Single-Input Single-Output (SISO) operation of the source radio interface 18'. The target RAN 32 then establishes (step g') a radio connection to the target radio interface 20' of the user terminal 16'.

Accordingly, the user terminal is configured (as shown in FIG. 7(B)) for SISO mode radio connections to both Source RAN 30 and target RAN 32.

The target RAN 32 then starts sending (step h') data packets downlink at the low data rate. The user terminal 16' then receives (step i') data on both interfaces 18', 20' each operating in SISO mode.

The user terminal 16' switches (step j') uplink (user plane) data from uplink via the source radio interface 18' to uplink via the target radio interface 20'.

Figure 7:
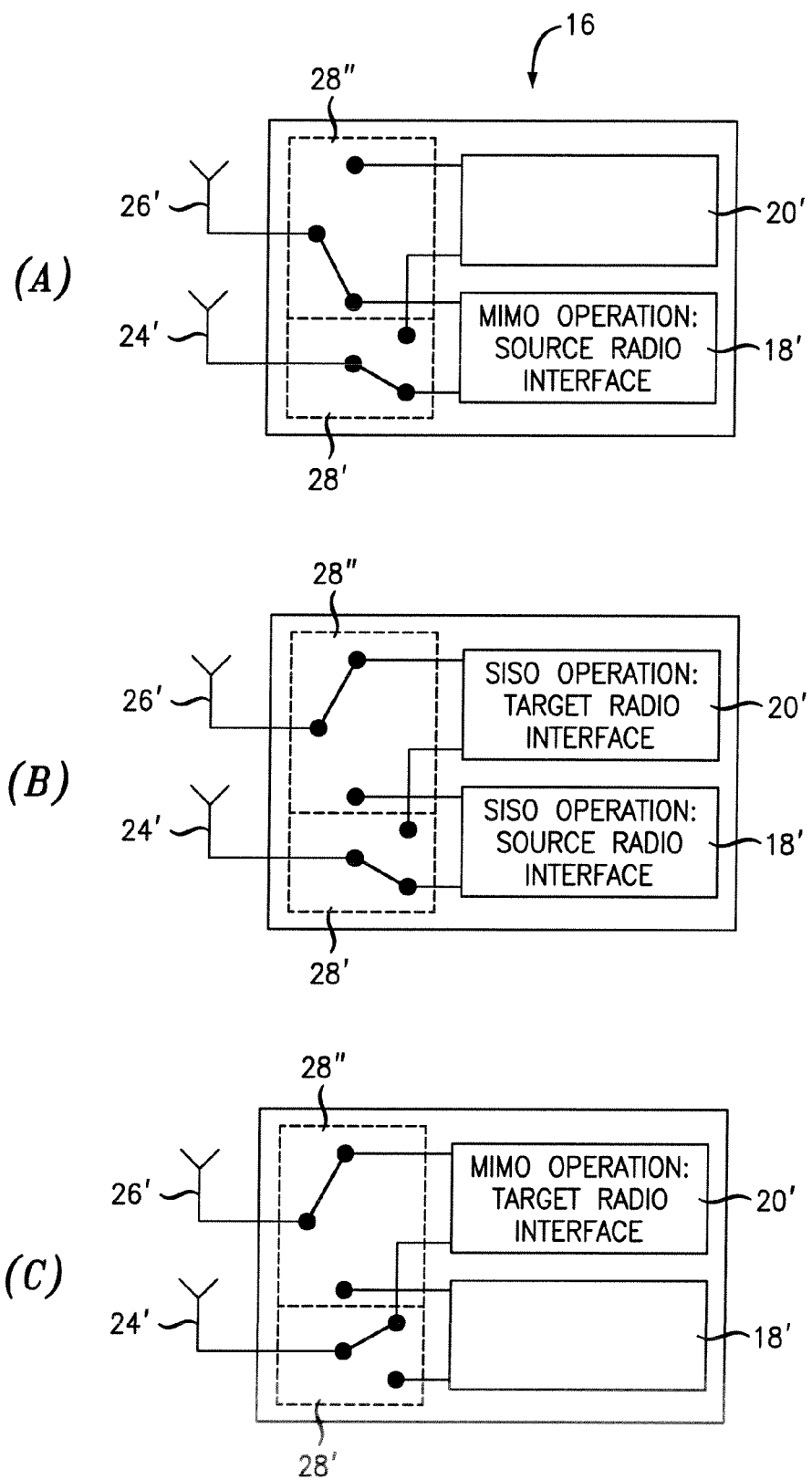
FIGS. 7(A), 7(B) and 7(C) are diagrams illustrating procedures in the user terminal shown in FIG. 6 for handover of the call-connection from the RAT to which the user terminal is call-connected, to another radio access technology (RAT)

The user terminal 16' senses (step k') that no further packets are received downlink via the source radio interface 18'. Accordingly the user terminal sends (step l') a "Handover Complete" instruction to the target RAN 32 and then switches both its antenna connections (as shown in FIG. 7 (C)) to the target radio interface so MIMO operation via the target radio interface 20' occurs (step m'). The target RAN 32 then increases (step n') the data rate to the high data rate mentioned previously. The user terminal 16' then deactivates (step o') the source radio interface 18'.

Some Other Options

In some embodiments, the second radio of the user terminal and/or the corresponding second radio access network is not MIMO-capable.

In some embodiments, in a handover operation, after a phase of receiving data of a service session at each radio by a corresponding radio connection, receiving data is ceased at the first radio, but reception of data continues at the second radio (via the radio connection from a second radio access network to the second antenna) so as to continue the service session. In this way, an apparently seamless handover of the user terminal is made from connection with the first radio access network to connection with the second radio access network.

In some embodiments, at least one downlink radio connection to the user terminal is a Single-Input Multiple-Output (SIMO) connection. In some embodiments, at least one downlink radio connection to the user terminal is a Multiple-Input Single-Output (MISO) connection.

General

The present invention may be embodied in other specific forms without departing from its essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

The invention claimed is:

1. A method of operation of a user terminal in a network for radio communications comprising a first radio access network and a second radio access network; the user terminal comprising a first radio, a second radio, a first antenna and a second antenna, the first radio comprising two ports for connection to the first and second antennas, at least one of the first and second antennas being switchably connectable to each of the radios, the method comprising:
   connecting the first and second antennas to the first radio such that each port is connected to a respective one of the first and second antenna;
   receiving data at the first radio passed via a first radio communication connection from the first radio access network to the first and second antennas;
   switching the second antenna from the connection to the first radio to a connection to the second radio,
   receiving data at the first radio passed via a second radio communication connection from a first base station of the first radio access network to the first antenna, and
   receiving data at the second radio passed via a third radio communication connection from a second base station of the second radio access network to the second antenna.

2. The method according to claim 1, in which the first radio is Multiple-Input Multiple-Output (MIMO) capable, and said first radio communication connection to the first and second antennas comprises a MIMO connection or downlink Single-Input Multiple-Output (SIMO) connection.

3. The method according to claim 1, in which at least one of said radio communication connections to the first antenna and said third radio communication connection to the second antenna comprises a Single-Input Single-Output (SISO) connection or downlink Multiple-Input Single-Output (MISO) connection.

4. The method according to claim 1, further comprising: measuring radio link quality between the user terminal and the second radio access network using the third radio communication connection from the second radio access network to the second antenna.

5. The method according to claim 1, further comprising: switching one of the first and second antennas connected to one of the first and second radios to connection with another of the first and second radios and receiving data at one of the first and second radios from one of the first and second radio access networks passed via a fourth radio communication connection to the first and second antennas.

6. The method according to claim 5, in which said switching one of the first and second antennas to connection with another of the first and second radios is switching the second antenna back to connection with the first radio, and said receiving data at one of the radios from one of the first and second radio access networks via the fourth radio communication connection to the first and second antennas is receiving data at the first radio from the first radio access network.

7. The method according to claim 5, in which said second radio is Multiple-Input Multiple-Output (MIMO) capable, and said switching one of the first and second antennas to connection with another of the first and second radios is switching the first antenna to connection with the second radio, and said receiving data at one of the first and second radios from one of the first and second radio access networks via the fourth radio communication connection to the first and second antennas is receiving data at the second radio from the second radio access network.

8. The method according to claim 7, in which a service session is continued over the first radio communication connection to the first or second antenna during the transfer from the first radio communication connection with the first radio via the first and second antennas to the fourth radio communication connection with the second radio via the first and second antennas so as to effect an apparently seamless handover of the user terminal from connection with the first radio access network to connection with the second radio access network.

9. The method according to claim 1, in which the second radio is not Multiple-Input Multiple-Output (MIMO) capable, and said receiving data at the first radio via the first radio communication connection from the first radio access network to the first antenna is ceased such that a service session continues by receiving data at the second radio via the third radio communication connection from a second radio access network to the second antenna.

10. The method according to claim 1, wherein the first and second radio access networks comprise one or more of Universal Mobile Telecommunications System (UMTS) and Global System for Mobile Communication (GSM) technologies.

11. The method according to claim 1, wherein the first and second radio access networks comprise two different types of radio access technologies.

12. A user terminal for wireless radio communications, the user terminal comprising a first radio, a second radio, a first antenna and a second antenna, the first radio comprising two ports for connection to the first and second antennas, at least one of the first and second antennas being switchably connectable in use to each of the first and second radios, the user terminal comprising a switch operative to:
  selectably connect the first and second antennas to the first radio so as to, in use, receive data at the first radio passed via a first radio communication connection from a first radio access network to the first and second antennas;
  selectably switch the connection of the second antenna to the second radio so as to receive data at the first radio passed via a second radio communication connection from a first base station of the first radio access network to the first antenna, and receive data at the second radio passed via a third radio communication connection from a second base station of a second radio access network to the second antenna.

13. The user terminal according to claim 12, in which the second radio is MIMO-capable.

14. The user terminal according to claim 12, wherein the user terminal is operative to measure radio link quality between the user terminal and the second radio access network using the third radio communication connection from the second radio access network to the second antenna.

15. The user terminal according to claim 12, wherein at least one of said radio communication connection to the first antenna and said radio communication connection to the second antenna comprises a Single-Input Single-Output (SISO) connection or downlink Multiple-Input Single-Output (MISO) connection.

16. The user terminal according to claim 12, wherein the second radio is not Multiple-Input Multiple-Output (MIMO) capable, and said receiving data at the first radio via the first radio communication connection from the first radio access network to the first antenna is ceased such that a service session continues by receiving data at the second radio via the third radio communication connection from a second radio access network to the second antenna.

17. The user terminal according to claim 12, in which the first radio is Multiple-Input Multiple-Output (MIMO) capable and the multiple-antenna radio communication connection is a MIMO connection.

18. The user terminal according to claim 12, wherein the first and second radio access networks comprise two different types of radio access technologies.

19. The user terminal according to claim 12, wherein the first and second radio access networks comprise one or more of Universal Mobile Telecommunications System (UMTS) and Global System for Mobile Communication (GSM) technologies.

20. A method of operating a user terminal in a network for radio communications comprising a first radio access network and a second radio access network, the user terminal comprising a first radio, a second radio, a first antenna and a second antenna, the first radio comprising two ports for connection to the first and second antennas, at least one of the first and second antennas being switchably connectable to each of the first and second radios, the method comprising:
  connecting the first and second antennas to the first radio such that each port is connected to a respective one of the first and second antenna;
  receiving data at the first radio via a first radio communication connection from a first base station of the first radio access network to the first and second antennas;
  switching the second antenna from connection to the first radio to connection to the second radio;
  receiving data at the first radio via a second radio communication connection from the first radio access network to the first antenna;
  receiving data at the second radio via a third radio communication connection from a second base station of the second radio access network to the second antenna; and
  measuring radio link quality between the user terminal and the second radio access network using the third radio communication connection from the second radio access network to the second antenna.

21. The method according to claim 20, further comprising: switching one of the first and second antennas connected to one of the first and second radios to connection with another of the first and second radios and receiving data at one of the first and second radios from one of the first and second radio access networks passed via a fourth radio communication connection to the first and second antennas.

22. The method according to claim 21, in which said switching one of the first and second antennas to connection with another of the first and second radios is switching the second antenna back to connection with the first radio, and said receiving data at one of the first and second radios from one of the first and second radio access networks via the fourth radio communication connection to the first and second antennas is receiving data at the first radio from the first radio access network.

23. The method according to claim 20, wherein the first and second radio access networks comprise two different types of radio access technologies.

24. The method according to claim 20, wherein the second radio is not Multiple-Input Multiple-Output (MIMO) capable, and said receiving data at the first radio via the first radio communication connection from the first radio access network to the first antenna is ceased such that a service session continues by receiving data at the second radio via the third radio communication connection from a second radio access network to the second antenna.

25. The method according to claim 20, wherein the first and second radio access networks comprise one or more of Universal Mobile Telecommunications System (UMTS) and Global System for Mobile Communication (GSM) technologies.

* * * * *